United States Patent [19]

Siegrist et al.

[11] Patent Number: 5,172,601
[45] Date of Patent: Dec. 22, 1992

[54] DRIVE NUT AND SCREW FOR SEAT ADJUSTER

[75] Inventors: Ronald R. Siegrist, Grass Lake; William M. Huffman, Jackson, both of Mich.

[73] Assignee: Hoover Universal, Inc., Plymouth, Mich.

[21] Appl. No.: 743,858

[22] Filed: Aug. 12, 1991

[51] Int. Cl.⁵ .................. F16H 25/20; B60N 2/06
[52] U.S. Cl. .................. 74/89.15; 248/429; 248/430; 297/330; 403/254; 403/348; 403/353
[58] Field of Search .................. 74/89.15, 424.8 R; 248/429, 430; 297/330; 403/254, 348, 353

[56] References Cited

U.S. PATENT DOCUMENTS

| | | | |
|---|---|---|---|
| 2,929,439 | 3/1960 | Tanaka et al. | 74/424.8 R X |
| 3,043,552 | 7/1962 | Colautti | 248/429 |
| 3,462,179 | 8/1969 | Hinkle | 403/353 X |
| 4,009,507 | 3/1977 | Lascarrou | 403/353 X |
| 4,217,812 | 8/1980 | Byrne | 74/424.8 VA X |
| 4,274,293 | 6/1981 | Ruger | 74/89.15 |
| 4,593,576 | 6/1986 | Schindel | 74/424.8 R X |
| 4,913,357 | 4/1990 | Bolyard et al. | 74/109 X |

*Primary Examiner*—Allan D. Herrmann
*Attorney, Agent, or Firm*—Harness, Dickey & Pierce

[57] ABSTRACT

A seat adjuster for a vehicle seat assembly is disclosed in which a drive nut and drive screw are provided with the drive nut lugs and mounting bracket configured to enable assembly of the seat adjuster after the drive screw has been threaded onto the drive nut. The drive screw is a four start screw enabling the speed of rotation of the screw to be reduced while maintaining the operating speed of the seat adjuster. The reduced rotating speeds reduces sound emission during operation of the seat adjuster.

5 Claims, 4 Drawing Sheets

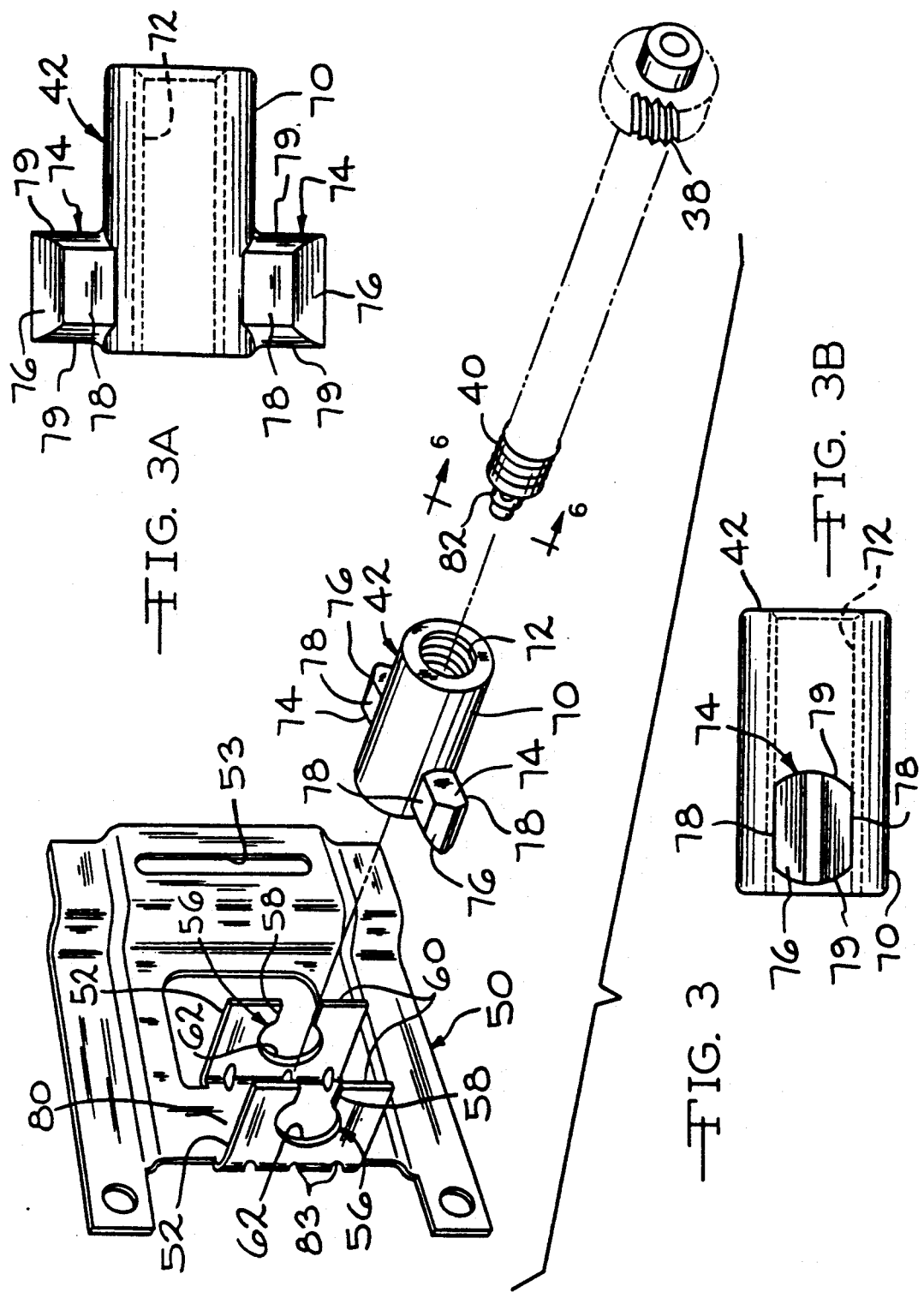

DRIVE NUT AND SCREW FOR SEAT ADJUSTER

BACKGROUND AND SUMMARY OF THE INVENTION

The present invention relates to a drive nut and drive screw for a seat adjuster and in particular to a nut and screw for a vehicle seat assembly that provides ease of assembly and low noise during operation.

In vehicle seat assemblies and, in particular, seat assemblies having power adjustment capability, it is desirable to provide an adjuster which produces low noise emissions during operation. Furthermore, it is necessary to provide an adjuster that can be easily assembled to reduce assembly time and errors.

Accordingly, it is an object of the present invention to provide a drive nut and drive screw for a vehicle seat adjuster that is both easy to assemble and produces low noise during operation.

It is an advantage of the present invention that the drive nut and mounting bracket are configured so that the nut is self aligning with the drive screw and the transmission assembly to prevent binding during operation of the seat adjuster.

It is a feature of the drive nut and its mounting bracket that the drive nut can be assembled with the bracket after the drive nut has been threaded onto the drive screw. This eliminates the cumbersome task of threading the screw into the drive nut at a time when major components of the seat are being assembled.

It is a further feature of the present invention to provide a four start drive screw that permits the motor to operate at a lower speed while providing the same operating speed of the seat adjuster. This reduces the noise transmitted from the motor, drive cable and transmission. It is yet another advantage that a four start screw with a rolled thread is straighter than either a one or three start screw with a rolled thread. The straighter screw shaft reduces drive nut vibration, further reducing the noise emission.

Further objects, features and advantages of the invention will become apparent from a consideration of the following description and the appended claims when taken in connection with the accompanying drawings.

BRIEF DESCRIPTION OF THE DRAWINGS

FIGS. 3A and 3B are top and side views respectively of the drive nut;

FIG. 6 is an end view of the drive screw.

DETAILED DESCRIPTION OF THE INVENTION

Figure 1:
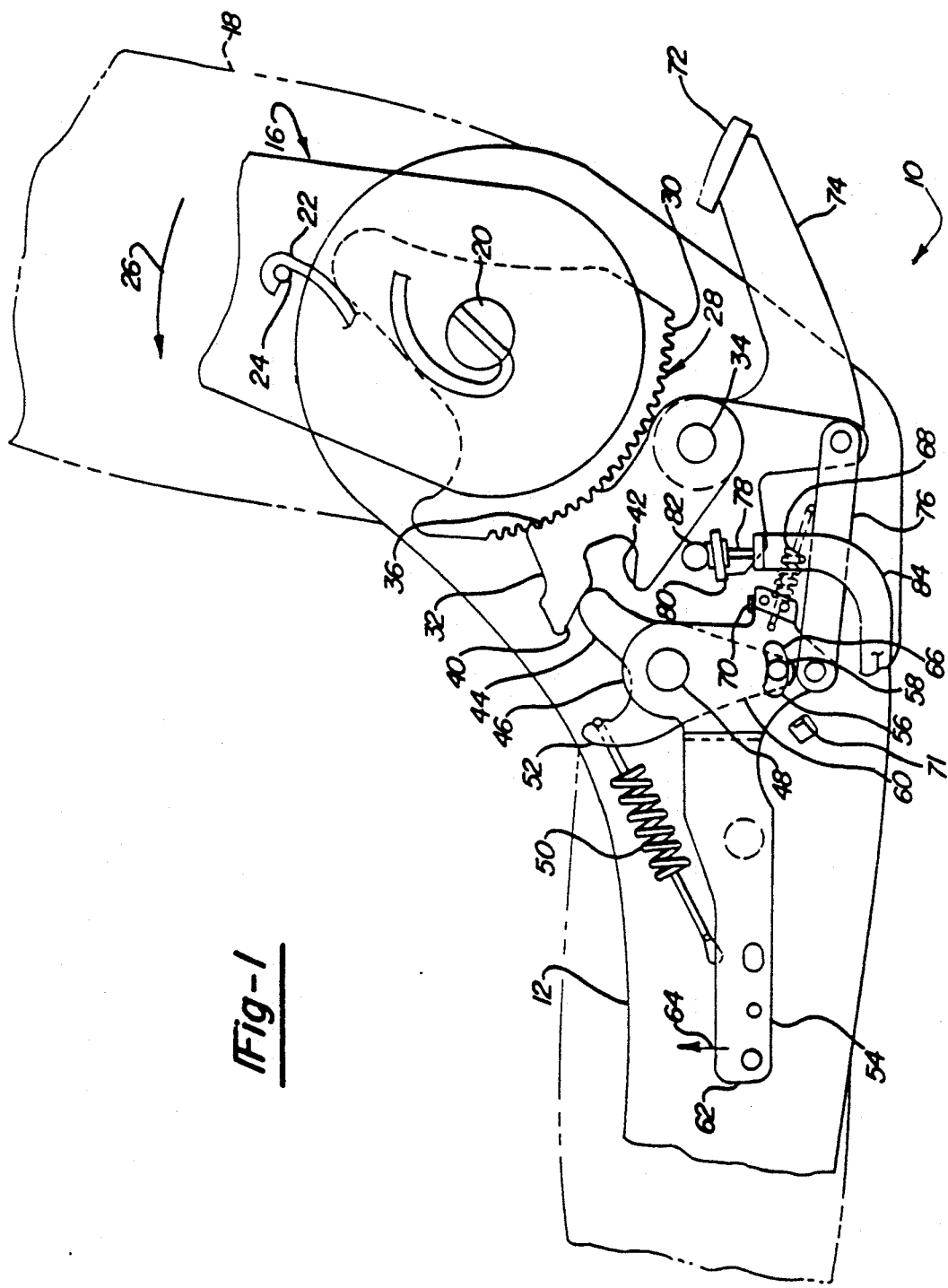
FIG. 1 is a side elevational view of a seat adjuster having the drive nut and screw of the present invention.

The seat structure 10 shown in FIG. 1 includes the drive nut and screw of the present invention in the seat adjuster. Seat structure 10 includes a lower rail or frame member 12 and an upper rail or frame member 14 that is slidably carried by the lower rail 12 to move the seat fore and aft relative to a motor vehicle in which the seat is mounted. The lower rail 12 includes a pair of support legs 16 that are adapted to mount the seat to a motor vehicle floor pan. A seat riser 18 is fastened to the upper rail and the seat cushion and seat back are mounted to the seat riser.

Figure 2:
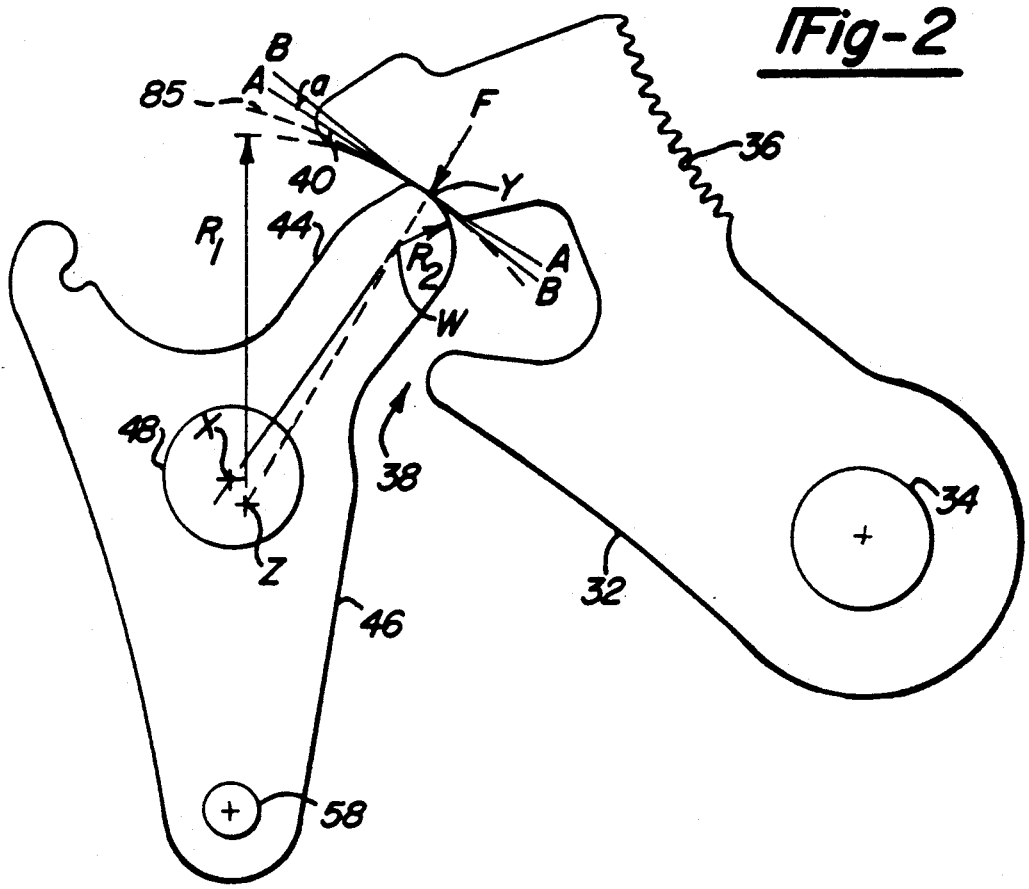
FIG. 2 is a front elevational view of the mechanism shown in FIG. 1.

Referring to FIG. 2, an electric drive motor 30 used for driving the seat adjuster is mounted to the seat riser 18 by bracket 32. Motor 30 is connected to a transmission assembly 34 by a flexible drive cable 36. The transmission assembly 34 includes a worm (not shown) that engages with and drives a worm gear 38 shown in FIG. 3. The worm gear 38 is molded onto and integral with the drive screw 40 of the present invention.

As will be described in greater detail below, the drive screw 40 is threaded into a drive nut 42. Drive nut 42 is in turn mounted to a bracket 50 that is fixed to the lower frame member 12 by one or more rivets 51 extending through the bracket slot 53. Rotation of the drive screw 40 while the drive nut 42 is held against rotation by bracket 50, produces an axial travel of the drive nut relative to the drive screw. The drive screw 40 is coupled to the upper frame member 14 through the transmission assembly 34 and bracket 32 while the drive nut is carried by the lower frame member 12. Rotation of the drive screw thus results in movement of the upper frame rail relative to the lower frame rail. This moves the seat assembly fore and aft relative to the vehicle.

The drive screw, drive nut and bracket 50 contain specific features that result in improved ease of assembly of the seat adjuster along with a reduction of noise emission during operation. The bracket 50 forms a pair of transversely spaced plates 52 each containing a key hole slot 56 with the two slots 56 aligned with one another. Each of the slots 56 includes a straight sided portion 58 that extends inwardly from the plate end 60 to an interior circular portion 62. The result is a slot 56 that resembles a key hole. The diameter of the interior circular portion 62 is larger than the width of the straight sided portion 58.

Figure 3:
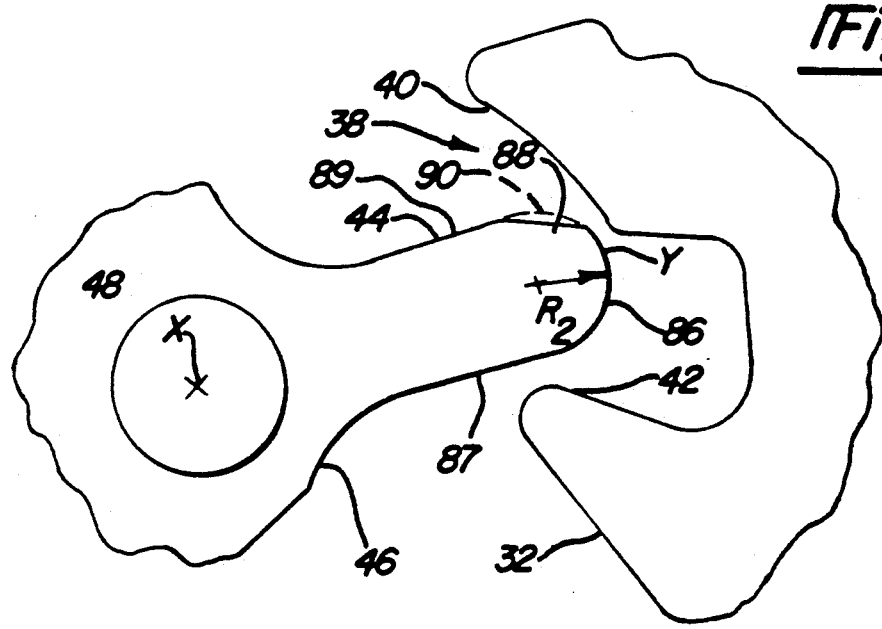
FIG. 3 is an exploded perspective view showing assembly of the drive nut and screw with the nut mounting bracket.
Figure 5:
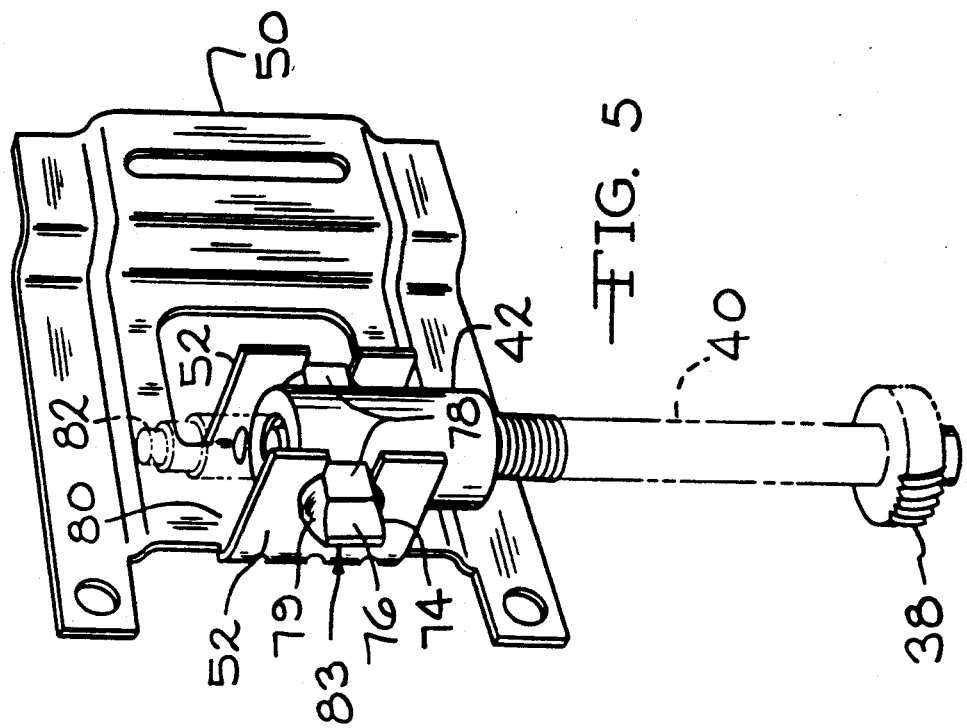
FIG. 5 is a perspective view similar to FIG. 4 in which the drive nut has been rotated to the fully assembled position and the drive screw has been further rotated through the drive nut.
Figure 4:
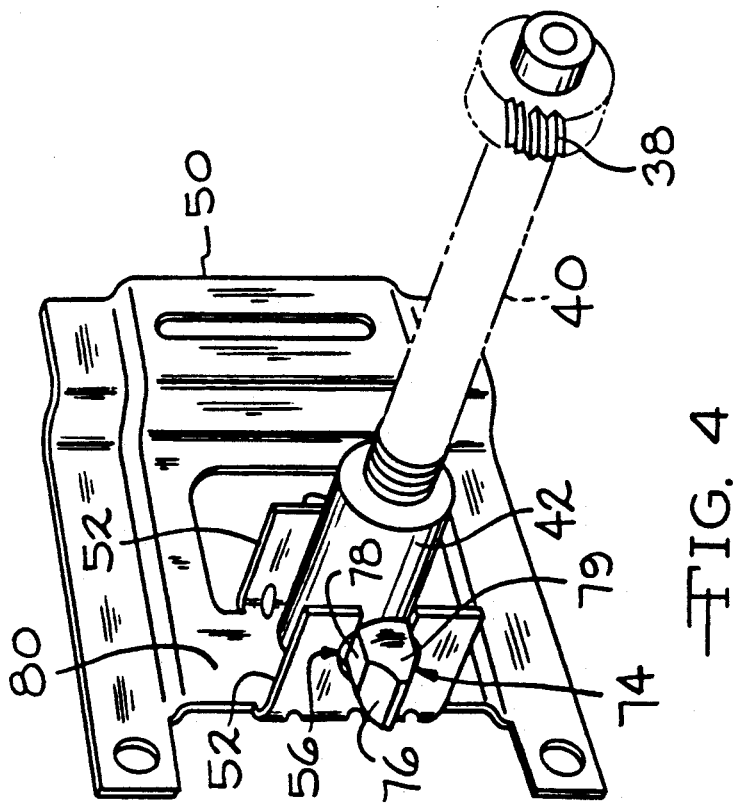
FIG. 4 is a perspective view similar to FIG. 3 showing the drive nut and screw threaded together with the nut in position partially assembled with the mounting bracket.

The drive nut 42 has a main body portion 70 with a threaded through passage 72. A pair of lugs 74 extend outwardly from the main body 70 in opposite directions. The lugs 74 have a constant cross section over their length except for a taper 76 at the lug ends. As shown in FIGS. 3A and 3B the lugs are generally circular in shape having two parallel flattened sides 78 and two circular sides 79 to produce a somewhat oval shape. The thickness of the lugs as measured between the two flattened sides 78 is small enough to enable the lugs to pass through the straight sided portions 58 of the slots 56. Such a passage of the lugs is shown in the progression from FIG. 3 to FIG. 4. Once the lugs have been inserted through the straight sided portion 58 of the slots to the circular interior portion, the nut is rotated 90° as shown in the progression from FIG. 4 to FIG. 5. The diameter of the circular portion of the lugs is sized so that the lugs can freely rotate in the slot circular interior portion. Once rotated 90° as shown in FIG. 5, the diameter of the circular shape of the lugs prevents the lugs from being withdrawn from the two slots 56.

The plates 52 together with a base portion 80 of the mounting bracket 50 forms a U-shaped structure open at the ends of the plates. This structure, with the slots 56 extending inwardly from the ends 60 of the plates, enables the drive nut 42 to be assembled with the mounting bracket after the drive screw 40 has been threaded into the drive nut. The open end of the U-shaped structure avoids any obstacle to the screw 40 during assembly. After the drive nut has been mounted to the bracket, the drive screw is further rotated to a position in which the end 82 of the drive screw extends beyond the drive nut as shown in phantom line in FIG. 5. In this position, removal of the drive nut is prevented since the end 82 of the drive screw will contact the base portion 80 of the bracket to prevent rotation of the drive nut to the release position shown in FIG. 4 where the flats of the lugs are aligned with the straight sides 58 of the bracket slots.

The plates 52 are reinforced by ribs or gussets 83 at the joint of the plates with the base 80. This helps to stiffen the plates 52 and prevents separation of the plates from one another during a vehicle collision. By providing the plates with sufficient strength to support themselves during a vehicle collision, it is not necessary to provide any enlargements or heads at the ends of the lugs 74 to prevent separation of the plates 52. The absence of an enlarged head on the lugs enables the drive nut to move laterally between the plates 52 by spacing the plates further than the width of the drive nut main body. The lateral movement of the nut between the plates 52 allows the nut to self align with the drive screw. The self alignment prevents binding of the drive screw, especially when the nut is drawn down close to the worm gear 38.

The drive screw 40 as shown in FIG. 6 is a four start screw having four separate threads 110. Numerous advantages flow from utilizing a four start screw rather than a one or three start screw as has been used in previous seat adjusters. The speed of rotation of the screw 40 can be reduced while maintaining the same linear travel speed of the drive nut along the screw 40. This enables the motor 30 to operated at a lower speed, whereby the noise emission from the motor, transmission, and flexible cable 36 are reduced. In addition, oscillation or orbiting travel of the drive nut at the distal end of the screw 40 due to bending of the screw occurs at a slower speed and produces less noise.

The threads 110 are rolled into the screw shaft rather than being cut to reduce the cost of manufacture of the drive screw. While rolling a four start screw, the forces on the screw shaft are equally opposed. This produces a screw shaft that is straighter than either a one start or a three start screw shaft. The straighter screw lessens the drive nut oscillation which further contributes to reduced noise emission.

The benefits of the four start screw thread can also be achieved with a drive screw used for the vertical lift adjustment (not shown). However, depending upon the geometry of the vertical lift mechanism, it may not be possible to provide sufficient lifting force with a four start screw. In such cases, a one, two or three start screw will be necessary.

The seat adjuster of the present invention includes a drive nut and mounting bracket that are configured to provide ease of assembly while also maintaining the required strength for the seat adjuster. In addition, the nut is driven by a four start screw to reduce the rotating speed of the motor and screw. An added feature of a four start screw is a straighter screw shaft which also reduces noise emission during operation.

While the drive nut and screw of the present invention have been shown in the context of a fore and aft seat adjuster, it is to be understood that the nut and screw can be used in other adjuster mechanisms including a vertical lift adjuster, recliner, etc., where a screw and nut drive is used.

It is to be understood that the invention is not limited to the exact construction illustrated and described above, but that various changes and modifications may be made without departing from the spirit and scope of the invention as defined in the following claims.

We claim:

1. An adjuster for a seat structure having first and second frame members adapted to move relative to one another to adjust the position of the seat structure, said adjuster comprising:

a mounting bracket affixed to one of said frame members, said bracket having a pair of transversely spaced plates extending from a base portion forming a generally U-shaped structure open at the ends of said plates with a key hole slot in each plate with said slots in alignment with one another, each of said slots having a straight sided portion extending inwardly from said end of said plates and an interior circular portion in communication with the straight sided portion of the slots with the circular portion having a diameter greater than the width of the straight sided portion of said slots;

a drive nut having a main body disposed between said plates with a pair of lugs extending oppositely from said main body and resting in said slots, said lugs at the largest cross section through the lugs having a circular section with two flattened opposite sides, the width between said flattened sides being of a size to pass through the straight sided portion of said slots and the diameter of the circular section being sized to fit within the circular portion of said slots whereby said lugs can pass through said slots by aligning the flattened sides of said lugs with the straight sided portion of said slots and, once said lugs are in the circular portion of the slots, rotating said drive nut ninety degrees to a position in which said lugs cannot be withdrawn from said slots, the main body of said nut being sized to permit side to side movement of said nut between said plates and said main body having a central bore threaded with four screw threads;

a drive screw having four screw threads carried by the other of the two frame members and mated with the drive nut through said threaded bore; and means for rotating said drive screw whereby the two frame members are moved relative to one another.

2. The adjuster of claim 1 wherein said screw and nut are aligned in the fore and aft direction of said seat to move one frame member fore and aft relative to the other frame member to adjust the position of the seat.

3. An adjuster for a seat structure having first and second frame members adapted to move relative to one another to adjust the position of the seat structure, said adjuster comprising:

a mounting bracket affixed to one of said frame members, said bracket having a base portion for attaching said bracket to said one of said frame members and a pair of transversely spaced parallel plates extending from said base portion in a direction generally normal to said base portion, said plates and said base portion forming a generally U-shaped section open at distal ends of said plates, each plate having a key hole slot extending into said plates from said distal ends toward said base portion with said slots being in alignment with one another, each of said slots having a straight sided portion extending inwardly from said ends of said plates and an interior circular portion in communication with the straight sided portion of the slots with the circular portion having a diameter greater than the width of the straight sided portion of said slots;

a drive nut having a main body disposed between said plates with a pair of lugs extending oppositely from said main body and resting in said slots, said lugs at the largest cross section through the lugs having a circular section with two flattened opposite sides, the width between said flattened sides being of a size to pass through the straight sided portion of said slots and the diameter of the circular portion being sized to fit within the circular portion of said slots whereby said lugs can pass through said slots by aligning the flattened sides of said lugs with the straight sided portion of said slots and, once said lugs are in the circular portion of the slots, rotating said drive nut ninety degrees to a position in which said lugs cannot be withdrawn from said slots, the main body of said nut being sized to permit side to side movement of said nut between said plates and said main body having a central threaded bore generally parallel to the flattened sides of said lugs;

a drive screw carried by the other of the two frame members and mated with the drive nut through said threaded bore; and means for rotating said drive screw whereby the two frame members are moved relative to one another;

the open end of said U-shaped section formed by said plates and said base portion enabling said drive nut to be mounted to said bracket after said drive screw has been partially threaded into said drive nut bore.

4. The adjuster of claim 3 wherein said drive screw is a four start screw having four screw threads and said drive nut bore is threaded with four screw threads.

5. The adjuster of claim 3 wherein said plates are joined to said base portion of said bracket and reinforced by gussets at the joint of said plates with said base portion.

* * * * *